United States Patent [19]

Murase et al.

[11] Patent Number: 4,503,316
[45] Date of Patent: Mar. 5, 1985

[54] DC WELDING POWER SUPPLY SYSTEM

[75] Inventors: Kazuo Murase, Yokohama; Toshihiko Watanabe, Kamakura; Naoki Takeuchi, Chigasaki; Tokuji Maruyama, Yokohama, all of Japan

[73] Assignee: Kabushiki Kaisha Kobe Seiko Sho, Kobe, Japan

[21] Appl. No.: 407,489

[22] Filed: Aug. 12, 1982

[30] Foreign Application Priority Data

| Aug. 13, 1981 [JP] | Japan | 56-127971 |
|---|---|---|
| Aug. 13, 1981 [JP] | Japan | 56-127972 |
| Aug. 13, 1981 [JP] | Japan | 56-127973 |
| Aug. 13, 1981 [JP] | Japan | 56-127974 |

[51] Int. Cl.³ .............................................. B23K 9/10
[52] U.S. Cl. ........................... 219/130.32; 219/130.33; 363/71
[58] Field of Search ....................... 219/130.21, 130.31, 219/130.32, 130.33, 137 PS, 130.1; 363/71

[56] References Cited

U.S. PATENT DOCUMENTS

| 3,621,365 | 11/1971 | Beck et al. | 363/71 |
| 3,792,225 | 2/1974 | Needham et al. | 219/130.21 |
| 4,425,613 | 1/1984 | Shelly | 363/71 |

OTHER PUBLICATIONS

B. E. Rossi, "Welding and Its Application", 1st edition, 6th impression, 1941, McGraw-Hill Book Co., Inc., New York, London, p. 109, Arc Welding Equipment, p. 109, lines 7-12.

Primary Examiner—Clifford C. Shaw
Attorney, Agent, or Firm—Oblon, Fisher, Spivak, McClelland & Maier

[57] ABSTRACT

A welding DC power supply system suitable for consumable or non-consumable electrode welding, including plural inverter units for converting a first direct current into an alternate current and for rectifying the alternate current to produce an output of a second direct current; a circuit connecting the output of terminals of the inverter units in parallel; a detection circuit for detecting the total output current of the inverter units; and a circuit for varying the number of operating inverter units according to the value of the detected total output current. According to other aspects of the invention, the power supply system is further provided with a phase control means for controlling the phases of alternate currents produced by the respective inverter units, or means for selectively actuating a particular inverter unit or units in a short circuit period of large current in dip transfer welding, or feedback means for suppressing the current in a controlled timing in the final stage of each short circuit period to prevent spattering as caused by bursting rupture of the large short circuit current.

7 Claims, 43 Drawing Figures

FIGURE 1 *PRIOR ART*

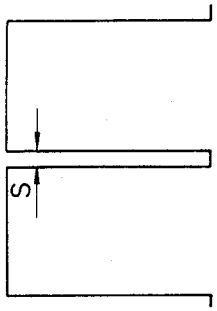
FIGURE 6
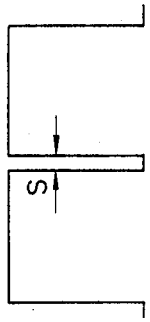
FIGURE 8
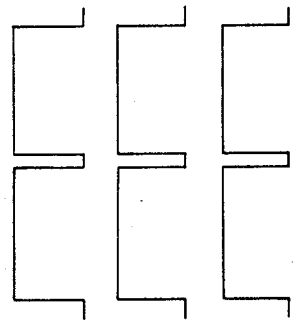
FIGURE 5A
FIGURE 5B
FIGURE 5C
FIGURE 7A
FIGURE 7B
FIGURE 7C

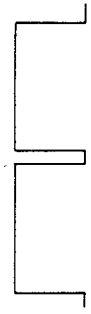
FIGURE 9A
FIGURE 9B
FIGURE 9C
FIGURE 11A
FIGURE 11B
FIGURE 11C
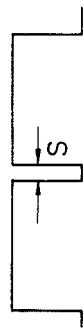
FIGURE 10
FIGURE 12

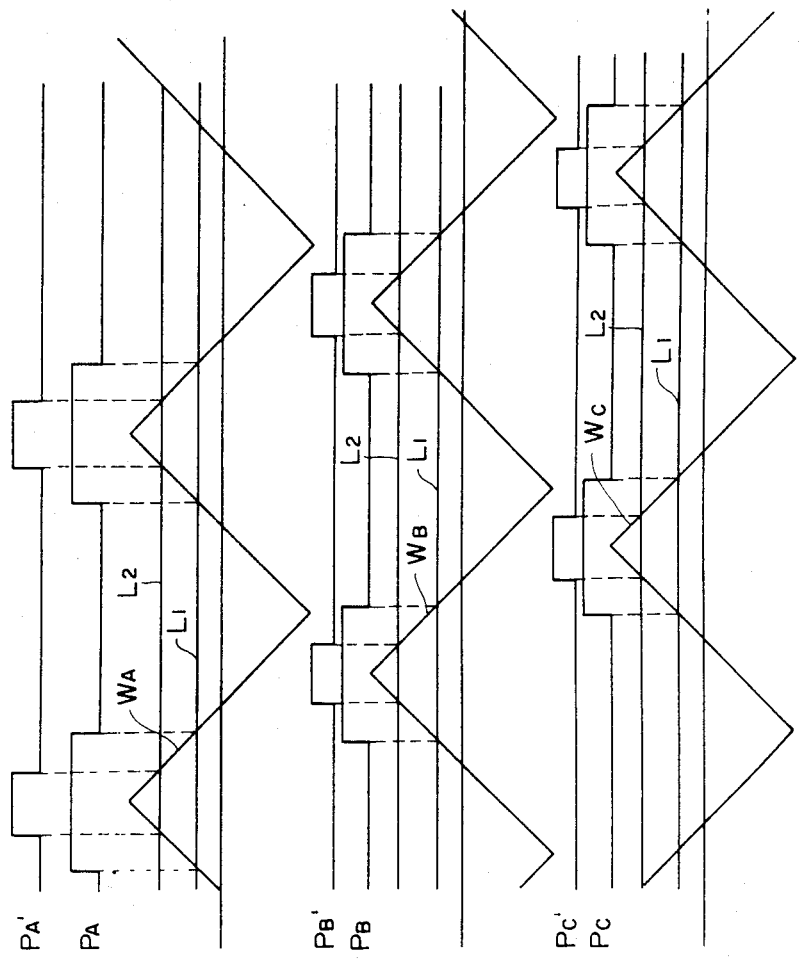

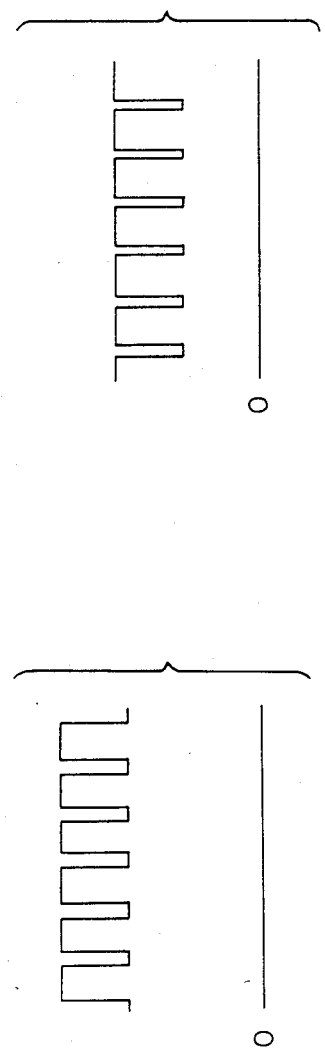
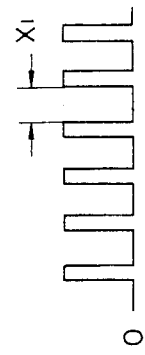
FIG. 21(a)
FIG. 21(b)
FIG. 21(c)
FIG. 21(d)

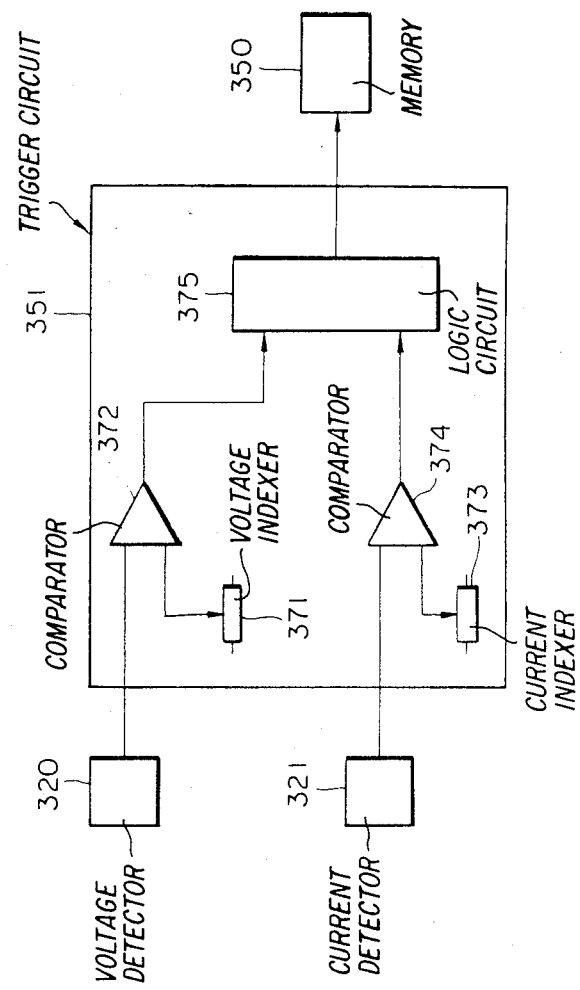

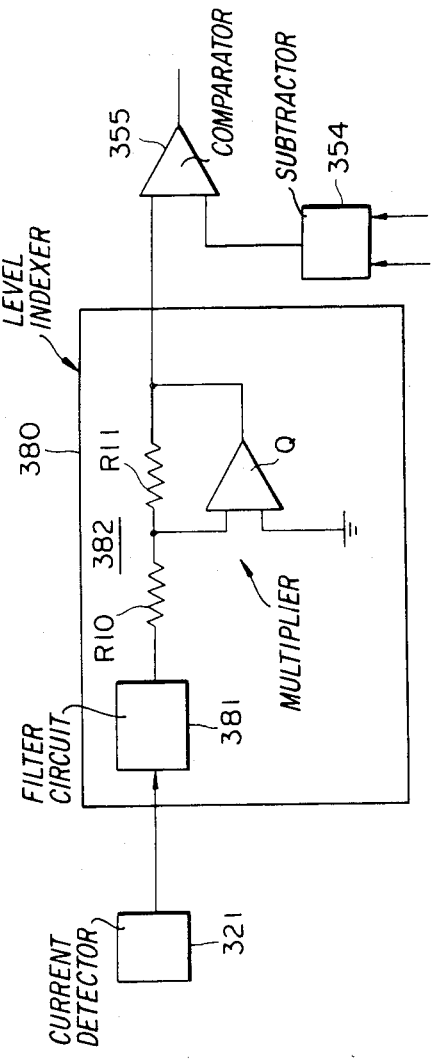

DC WELDING POWER SUPPLY SYSTEM

BACKGROUND OF THE INVENTION

1. Field of the Invention

This invention relates to a power supply for welding machines using a consumable or non-consumable electrode, and more particularly to an inverter type power supply system.

2. Description of the Prior Art

One example of a conventional power source for DC welding involves a system arranged to drop the line voltage of a three-phase AC source to about 40 to 85 V by means of a transformer and to phase control the dropped voltage by a thyrister for controlling its voltage or current and for rectification, supplying a predetermined DC current to a welding electrode through a reactor. The welding power supply of this sort has a drawback in that it is very heavy, for example, weighing about 160 kg in the case of a power supply of 500 A, due to the use of a transformer and a reactor which are heavy and large in size, and therefore is difficult to move or handle. Besides, the phase control of the line voltage generates ripple voltages of long periods at a low output voltage, destabilizing the welding current and voltage to invite welding defects such as spattering, defective bead appearance and insufficient penetration.

In order to eliminate the above-mentioned difficulties, there has been developed a welding power supply using a high frequency type inverter, in which the line AC power is rectified and converted into alternate current of a higher frequency (e.g., 2 kHz) by an inverter, the converted voltage (to 40 or 85 V) is dropped by a transformer and rectified through a rectification circuit for supplying DC power of a predetermined voltage to a welding electrode through a reactor.

The transformer and reactor in the high frequency inverter type power supplies are smaller in size and weight, so that it is possible to reduce the size and weight of the power supply system as a whole while minimizing the ripple component of the welding DC voltage and current to permit relatively stable welding operations.

As illustrated particularly in FIG. 1, the inverter circuit which is employed in such a welding power supply generally has transistors 11 to 14 connected bridge-like between output terminals of a rectifier circuit 7 with diodes 1 to 6 and turned on and off by the output signal of a drive circuit 20 in the manner as described hereinafter, thereby to produce an alternate current in the output transformer 21.

Namely, when the transistors 11 and 13 are simultaneously turned on, current flows through the output transformer 21 in the direction of arrow A. On the other hand, if the transistors 11 and 13 are simultaneously turned off by the drive circuit 20, while instead turning on the transistors 12 and 14 simultaneously, current flows through the output transformer 21 in the direction of arrow B. This on-off operation of the transistors is repeated at a frequency of 2 KHz, for example, to supply alternate waves to the output transformer 21.

The output of the transformer 21 is rectified through a rectifier circuit 22 and applied to a welding electrode 24 through a reactor 23 to generate an arc across the welding electrode 24 and a base metal 24' thereby to perform a predetermined welding operation.

The welding voltage and welding current are controlled by varying the conduction period t of the transistors 11 to 14 as shown particularly in FIGS. 2a, 2b and 2c depicting output waveforms as obtained by using a resistance load without a DC reactor, namely, at FIG. 2(a) a waveform at the maximum output, at FIG. 2(b) a waveform at an output level of $\frac{1}{2}$ the maximum output, and at FIG. 2(c) a waveform at an output level of 1/5 the maximum output.

As seen from FIG. 2(c), the pulse width t is narrowed in a low welding current range, inviting deteriorations in the welding characteristics due to an increased ripple content in the output voltage. In this regard, although the ripple content of the output voltage can be minimized by increasing the reactance of the reactor 23, it is desired to minimize the reactance of the reactor 23 as much as possible since a higher impedance of the reactor 23 will delay response and lower efficiency.

The above-mentioned inverter type power supply has another problem in that a ripple component attributable to the characteristics of the transistors of the inverter circuit appears in the range of low welding current and voltage. In this connection, reference is had to FIGS. 3a, 3b and 3c in which there are shown at (I) to (III) one-period waveforms at high, medium and low load currents, respectively. Shown at FIG. 3a is the output waveform of the rectifier circuit 22, at FIG. 3b the base input of the transistors 11 and 13, and at FIG. 3c the base input of transistors 12 and 14.

In FIGS. 3a, 3b and 3c, $t_{on}$ indicates the turn-on time of the transistors 11 to 14, $t_{off}$ their turn-off time, and $t_{stg}$ their storage time.

Referring to the circuit diagram of FIG. 1, even if high speed switching transistors are used for the transistors 11 to 14, they have a turn-on time $t_{on}$ of 1 μs, a turn-off time $t_{off}$ of 1 μs and a storage time $t_{stg}$ of 2 μs. Therefore, in a case where the inverter frequency is 50 KHz and used in a range lower than $\frac{1}{3}$ of the maximum output, the output becomes unstable in a range smaller than $\frac{1}{3}$ of the maximum output. If the output is lower than $\frac{1}{3}$, there will be produced an output of $\frac{1}{3}$ at every two or three periods, with an output of 1/6 to 1/10 in average. This means increases of the ripple current and voltage, which will lead to destabilization of the welding current, increased spattering, defective bead appearance and insufficient penetration. The ripple component can be reduced by increasing the reactance of the reactor but it will lower the response and efficiency as mentioned hereinbefore.

The rates of $t_{on}$, $t_{off}$ and $t_{stg}$ at $\frac{1}{2}$ periods can be reduced by lowering the inverter frequency, thereby to stabilize the low output current and voltage. However, it will increase the weight of the transformer and that of the reactor contrary to the initial objective of minimizing the transformer and reactor size and weight by increasing the inverter frequency.

In addition, the welding power supply of this sort is required to be capable of stabilizing the welding characteristics over large and small current ranges. For instance, a welding power source of 500 A should not show a material drop in welding characteristics at a $\frac{1}{3}$ output level, namely, at 170 A.

On the other hand, in dip transfer welding in which short circuiting and arcing alternately take place, there occur large differences in voltage and current between a short circuit period and an arcing period. Therefore, in designing a power supply for dip transfer welding, it has been the general practice to afford a large capacity far higher than an average output, and thus to employ component parts of large capacities, resulting in a power supply system which is increased in weight and size as well as in cost.

Further, in order to suppress spattering effectively in the dip transfer welding, the power supply is required to be able to control the current and voltage with high response and at a suitable time point in a final stage of each short circuit period of large current since otherwise intense spattering occurs by explosive rupturing of the short circuit.

SUMMARY OF THE INVENTION

The present invention contemplates to eliminate the above-mentioned various drawbacks or difficulties of the conventional welding power supply systems.

It is an object of the present invention to provide a welding power supply system of quick response which is of compact and light construction and has a wide output range with decreased ripple component in current and voltage to ensure satisfactory welding performance quality.

It is a more particular object of the present invention to provide a welding power supply system employing plural inverter units of a relatively small capacity which are selectively operated according to the load condition.

It is another object of the invention to provide an inverter type duplex power supply system for use in dip transfer welding, in which a number of inverter units are selectively operated to supply suitable power in short circuit and arcing periods of the welding operation.

It is a further object of the present invention to provide a power supply system for dip transfer welding, which is capable of feedback control of high response to suppress the current at a sutiable time point in the final stage of each short circuit period to ensure spatter-free welding operation.

These and other objects are achieved according to the present invention, by providing a welding DC power supply system suitable for consumable or nonconsumable electrode welding, including plural inverter units adapted to convert a first direct current into an alternate current and to rectify the alternate current to produce an output of a second direct current; a circuit connecting the output terminals of the inverter units in parallel; a detection circuit for detecting the total output current of the inverter units; and a circuit for varying the number of operating inverter units according to the value of the detected total output current. According to other aspects of the invention, the power supply system is further provided with a phase control means for controlling the phases of alternate currents produced by the respective inverter units, or means for selectively actuating a particular inverter unit or units in a short circuit period of large current in dip transfer welding, or feedback means for suppressing the current in a controlled timing in the final stage of each short circuit period to prevent spattering as caused by bursting rupture of the large short circuit current.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

FIGS. 5A to 5C, 7A to 7C, 9A to 9C and 11A to 11C are waveform diagrams showing output waveforms of the respective inverter units in the embodiment of FIG. 4 by way of square waves;

FIGS. 6, 8, 10 and 12 are output waveforms in the embodiment of FIG. 4;

FIGS. 19a–19d are waveform diagrams explanatory of the operation of a comparator in the embodiment of FIG. 17;

FIG. 21 is a waveform diagram showing the total output of the inverter units of FIG. 4;

FIG. 24 is a circuit diagram showing a modification of the trigger circuit employed in the embodiment of FIG. 23; and FIG. 25 is a circuit diagram of a level indexer employed in the embodiment of FIG. 23.

DESCRIPTION OF PREFERRED EMBODIMENTS

Figure 1:
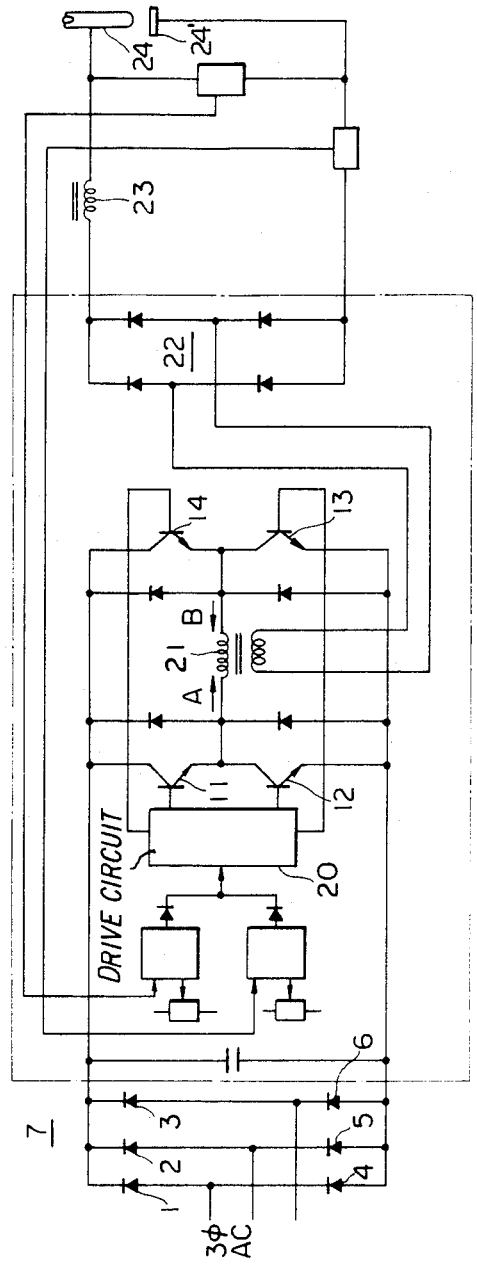
FIG. 1 is a circuit diagram of a conventional inverter type welding DC power source.
Figure 2:
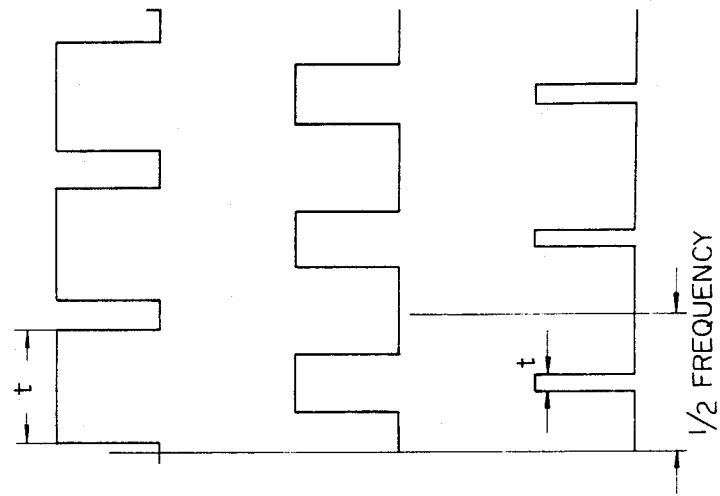
FIGS. 2a to 2c are waveform diagrams explanatory of the operation of the system of FIG. 1.
Figure 3:
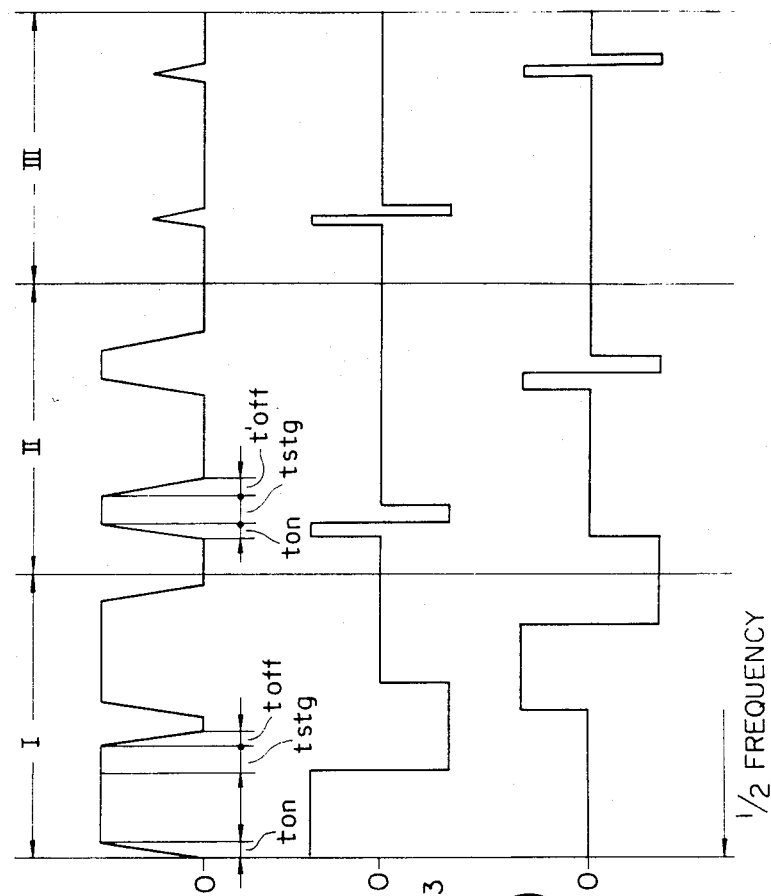
FIGS. 3a to 3c are waveform diagrams explanatory of the operation and output waveforms of the transistors in the system of FIG. 1.
Figure 4:
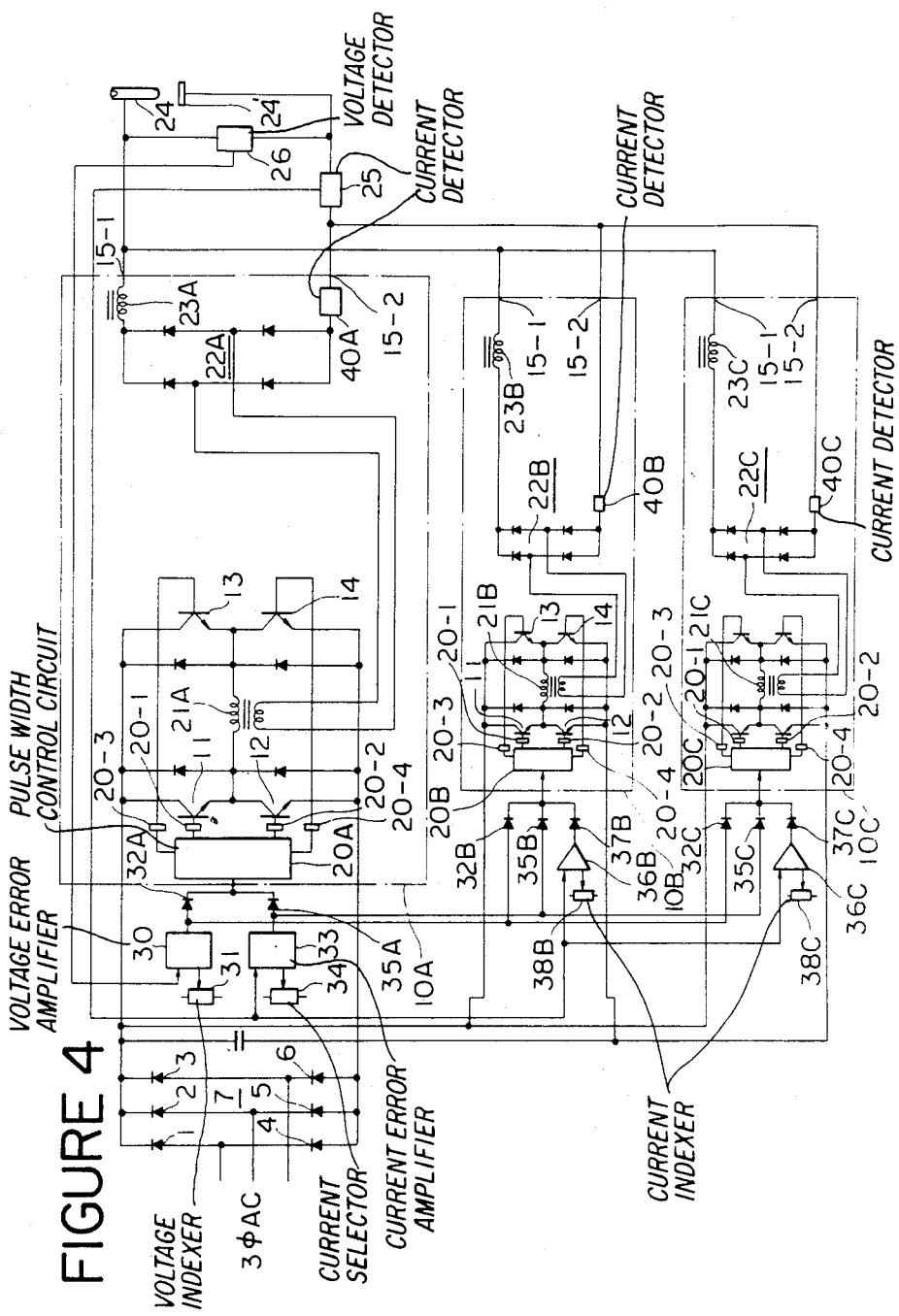
FIG. 4 is a circuit diagram of one embodiment of the present invention.

Referring to FIG. 4, there is shown a DC welding power supply system according to the present invention, in which designated by reference numerals 10A to 10C are high frequency inverter units each including transistors 11 to 14 which are bridged in the same manner as in FIG. 1, a pulse width control circuit 20A, 20B or 20C, base drive circuits 20-1 to 20-4 for the respective transistors, an output transformer 21A, 21B or 21C, and a rectification circuit 22A, 22B or 22C.

The inverter units 10A to 10C are connected to DC output terminals of a rectification circuit 7 with diodes 1 to 6 to apply a predetermined DC voltage across the collector of transistor 11 and the emitter of transistor 12 and across the collector of transistor 13 and the emitter of the transistor 14 of the respective inverter units 10A to 10C.

The inverter units 10A to 10C have the respective positive (+) output terminals 15-1 connected commonly and have their negative (−) output terminals 15-2 connected commonly to the source side of a current detector 25. Thus, the output terminals of the respective inverter units 10A to 10C are connected in parallel with each other.

Connected between the output terminals are a voltage detector 26 which detects the output voltage of the power supply, a welding electrode 24 and a base material 24'.

Designated at 30 is an error amplifier for voltage control, which is differentially applied with a preset voltage signal supplied from a voltage indexer 31 and with the output signal of the voltage detector 26 indicating the output voltage of the power supply, to produce a voltage signal proportional to the difference between the two input signals.

The output terminal of the error amplifier 30 is connected to the input terminals of the pulse width controls 20A to 20C of the respective inverter units 10A to 10C through diodes 32A to 32C, respectively. Thus, the pulse width controls 20A to 20C of the inverter units 10A to 10C are commonly supplied with the output signal of the error amplifier 30.

The reference numeral 33 denotes an error amplifier for current control, which is differentially applied with a signal of a preset current from the current selector 34 and with the output signal of the current detector 25 indicating the output current of the power supply, to produce an output signal according to the difference between the input signals.

The output terminal of the current error amplifier 33 is connected to the pulse width controls 20A to 20C of the inverter units 10A to 10C through diodes 35A to 35C, respectively. The pulse width controls 20A to 20C are thus commonly supplied with the output of the error amplifier 33.

The inverter units 10B and 10C are actuated or deactuated by comparators 36B and 36C according to the level of load current, the comparators 36B and 36C being connected to the pulse width controls 20B and 20C through diodes 37B and 37C, respectively. The comparators 36B and 36C each have one input terminal thereof connected to the current detector 25 and the other input terminal to the current indexers 38B and 38C, respectively. The current indexer 38B is preset, for example, at a current level ($\frac{1}{3} - \alpha$) slightly smaller than $\frac{1}{3}$ of the maximum output current $I_0$ of the welding power supply, so that the comparator 36B produces an output of "1" if the welding current is higher than the preset value to actuate the inverter unit 10B. On the other hand, if the welding current is lower than the above-mentioned preset value, the comparator 36B produces an output of "0" to de-actuate the inverter unit 10B.

The current indexer 38C is preset, for example, at a current level ($\frac{2}{3} - \alpha$) slightly lower than $\frac{2}{3}$ of the maximum output current $I_0$ of the welding power supply, and actuates or de-actuates the inverter unit 10C depending on whether or not the welding current is greater than the preset value.

The inverter units 10A to 10C are provided with current detectors 40A to 40C, respectively, to control the current of the corresponding inverter unit by a circuit (not shown) when its output current exceeds a predetermined rated value.

With the welding power supply of the foregoing arrangement, if the welding current is greater than $\frac{2}{3}$ of the rated value $I_0$, the comparators 36B and 36C produce output signals of "1" to hold each of the inverter units 10A to 10C in the actuated state. Consequently, the transistors 11 to 14 of the inverter units 10A to 10C are turned on and off with a predetermined timing according to the output signals of the base drive circuits 20-1 to 20-4, producing a high frequency output at the output transformers 21A to 21C. The output currents of the transformers 21A to 21C are rectified through the rectification circuits 22A to 22C, respectively, and applied to the welding electrode 24 through reactors 23A to 23C to produce a predetermined arc for welding the base material 24'. In this instance, the sum of the output currents of the inverter units 10A to 10C flows through the welding electrode 24.

On the other hand, the output voltage of the welding power supply is detected by the voltage detector 26, and the value of the detected voltage is applied to the voltage error detector 30 which produces an output signal according to the difference from the preset value specified by the voltage indexer 31. This output signal is applied to the pulse width controls 20A to 20C through diodes 32A to 32C, respectively, to control their output pulse width and thus the conduction angle of the transistors 11 to 14, maintaining the output voltage of the inverter units 10A to 10C at the preset value.

The current detector 25 which detects the welding current supplies a signal of the detected current to the current error amplifier 33 which in turn produces an output signal according to the difference from the value of preset value specified by the current indexer 34. This output signal is applied to the pulse width controls 20A to 20C of the inverter units 10A to 10C through diodes 35A to 35C, respectively, to control their output pulse width. Thus, the conduction angle of the transistors 11 to 14 are controlled to maintain the welding current at the preset value.

The output current waveforms of the inverter units 10A to 10C in a case where the output current is greater than $\frac{2}{3}$ are shown at A to C of FIG. 5, and the output waveform of the welding current is shown in FIG. 6. In FIGS. 5a through 16, waves are shown in a square form for the convenience of explanation.

In a range where the load is relatively small and the load current is lower than ($\frac{2}{3} - \alpha$) but greater than ($\frac{1}{3} - \alpha$) of the maximum output current, the comparator 36C and the pulse width control 20C produce output signals of "0", de-actuating the inverter unit 10C as shown at C of FIG. 7. In this stage, the output signal of comparator 36B is at "1", so that the inverter unit 10B is put in operation to produce a predetermined output as shown at A and B of FIG. 7. Therefore, in this case the sum of the output signals of the inverter units 10A and 10B is applied to the welding electrode as shown in FIG. 8.

In a case where the load is smaller than ($\frac{1}{3} - \alpha$) of the maximum output, the comparators 36B and 36C both produce an output signal of "0" as shown at B and C of FIG. 9 to de-actuate the inverter units 10B and 10C, performing the welding operation solely by the output of the inverter unit 10A.

As seen from FIGS. 6, 8 and 10, even if the load current is reduced, the width of the space S in the output waveform of the inverter units remains unchanged, with no possibility of increasing the ripple component in the voltage to be applied to the welding electrode. It follows that the voltage is stably supplied to the welding electrode.

Figure 13:
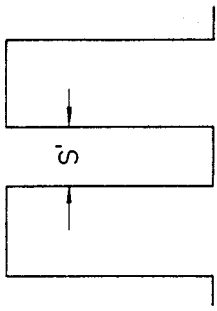
FIGS. 13 to 16 are output waveforms in the conventional power supply.
Figure 14:
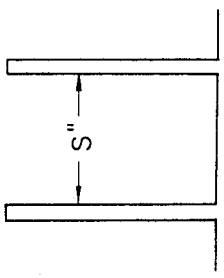
Figure 15:
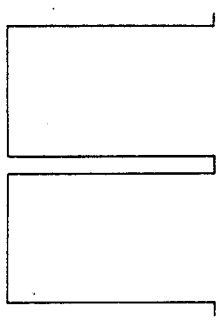

On the other hand, in the case of the conventional power supply using a single inverter, the width of the space S' of the output waveform is broadened even with a load greater than $\frac{1}{3}$ of the maximum output, as shown in FIGS. 13 to 15, increasing the content of the ripple component.

The broadening of the space S occurs even in the embodiment of FIG. 4 if the load is reduced further, for example, to less than 1/9 of the maximum output, as seen in FIG. 11, increasing the content of the ripple component but to an extent which will practically cause no trouble. Thus, according to the present invention, a power supply with a maximum output of 400 A can ensure a stable welding operation even at a small output current, for example, at about 60 A.

Figure 16:
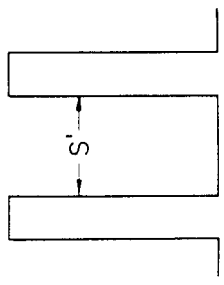

In contrast, with the conventional power supply, the space S' of the output waveform of the inverter is extremely broadened at an output level of about 1/9 of the maximum output as shown particularly in FIG. 16, increasing the ripple content to such an extent as will be practically unacceptable. In addition, in view of the storage time $t_{stg}$ of the transistors, it is difficult to employ a high frequency for obtaining an output of about 1/9 and to attain the objective of providing a compact power supply.

Although three inverter units are employed in the foregoing embodiment, it is possible to employ a combination of an arbitrary number of inverter units in the power supply according to the present invention.

Owing to the reduction of the ripple component in the output waveform, the reactance of the reactor in the output circuit can be lowered, permitting prevention of deterioration in the response characteristics which would otherwise be caused by the reactance. Thus, there can be obtained a welding power supply of high response which can comply with higher requirements in the welding operations.

Further, by the use of a high inverter frequency, it becomes possible to reduce the size and weight of the output transformers. In combination with the effect of minimizing the size and weight of the reactor accruing from the reduction of the reactance, it contributes to minimize the size and weight of the power supply itself. Besides, the inverter units which employ universal type switching elements of small size as compared with the maximum output can be constructed at a low cost.

The power supply of the present invention is particularly suitable for use in short arc welding in which a period of short circuit and a period of arc generation alternately takes place and which involves large current variations from 130 A of the arcing period to 400 A of the short circuit period although the average current is 150 A, requiring the output current of a power supply to follow such large current variations. The embodiment of FIG. 4 can comply with such a requirement.

Under a light load, the switching elements like transistors of the inverters are also turned on for a longer time period as compared with their time characteristics including turn-off time $t_{off}$, conduction time $t_{on}$ and storage time $t_{stg}$, preventing an accurate control from being impaired by the various time characteristics.

The welding electrode in the foregoing embodiment may be either a consumable type or a non-consumable type. If desired, arrangement may be made such that a group or groups of plural inverter units are actuated and de-actuated according to the load current.

Figure 17:
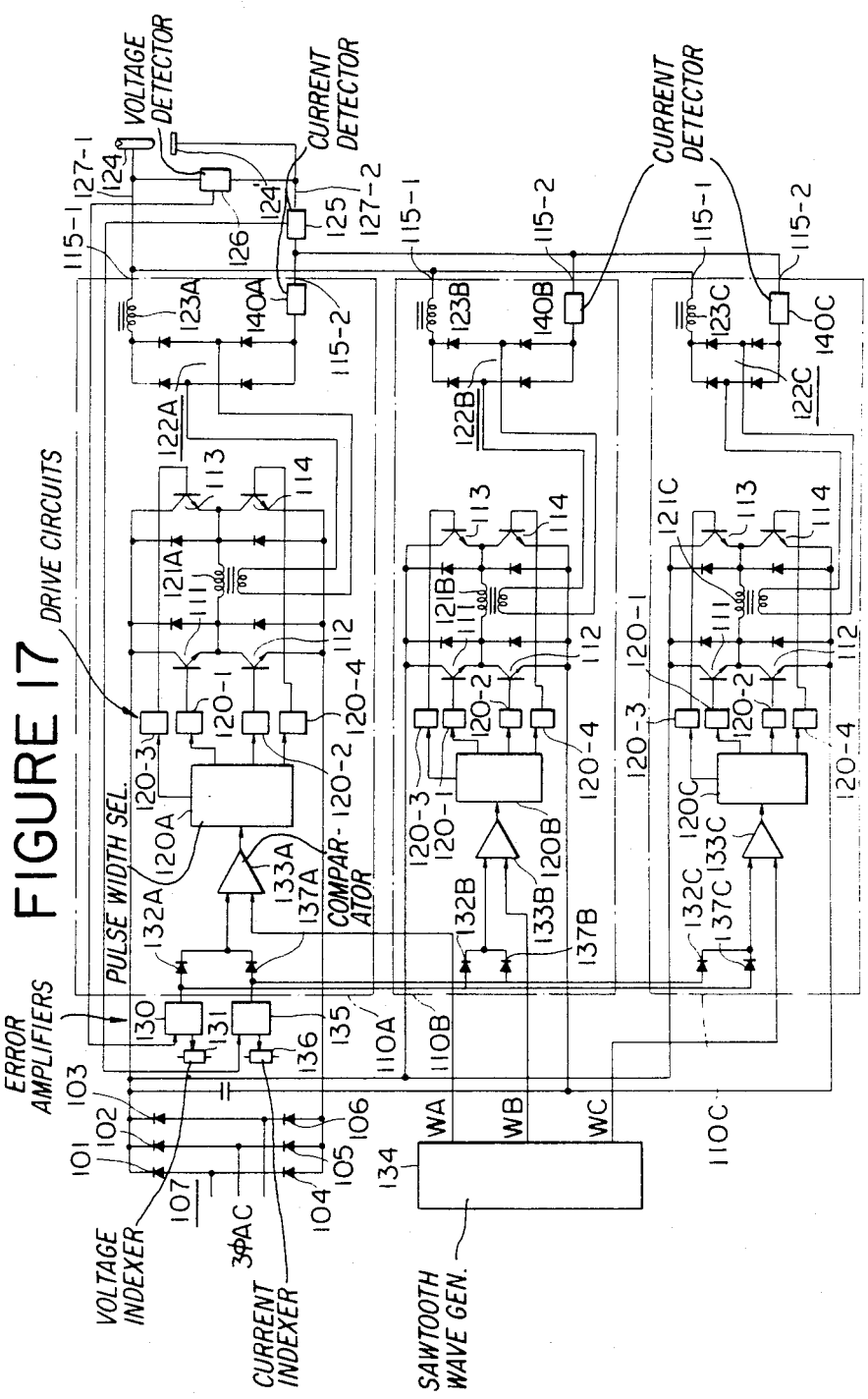
FIG. 17 is a circuit diagram of another embodiment of the present invention.

Referring now to FIG. 17, there is shown another embodiment of the present invention, which is basically the same as the foregoing embodiment except for the provision of a phase control means for controlling the phase angles of alternate waves produced by the respective inverter units. In FIG. 17, designated at 110A to 110C are high frequency inverter units each including transistors 111 to 114 which are bridged in the same manner as in FIG. 1. The FIG. 17 embodiment further includes a pulse width selector 120A, 120B or 120C, base drive circuit 120-1 to 120-4 for the respective transistors, an output transformer 121A, 121B or 121C, and a rectification circuit 122A, 122B or 122C.

The inverter units 110A to 110C are connected to the DC output terminals of a rectification circuit 107 with diodes 101 to 106 to apply a predetermined DC voltage across the collector of transistor 111 and the emitter of transistor 112 and across the collector of transistor 113 and the emitter of the transistor 114 of the respective inverter units 110A to 110C.

The inverter units 110A to 110C have the respective positive (+) output terminals 115-1 connected commonly and have their negative (−) output terminals 115-2 connected commonly to the source side of a current detector 125. Thus, the output terminals of the repsective inverter units 110A to 110C are connected in parallel with each other.

Connected between the output terminals are a voltage detector 126 which detects the output voltage of the power supply, a welding electrode 124 and a work 124'.

Designated at 130 is an error amplifier for voltage control, which is differentially supplied with a preset voltage signal supplied from the voltage indexer 131 and with the output signal of the voltage detector 126 indicating the output voltage of the power supply, to produce a voltage signal according to the difference between the input signals.

Figure 18:
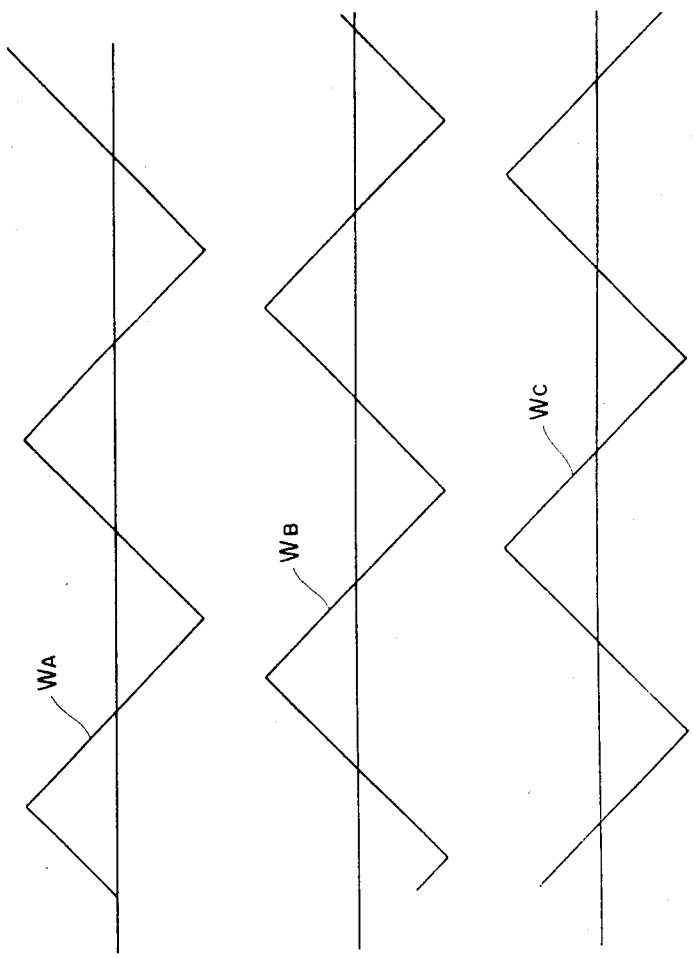
FIG. 18 is a waveform diagram showing one example of triangular waves useful in the embodiment of FIG. 17.
Figure 20B:
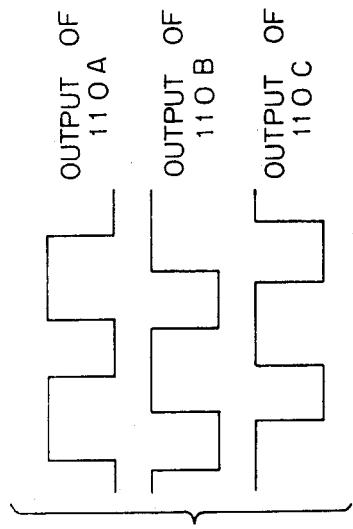
FIGS. 20a–20d are diagrams of output waveforms of inverter units shown in FIG. 17.
Figure 20D:
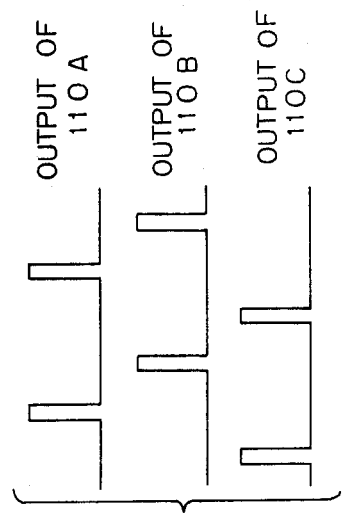
Figure 20A:
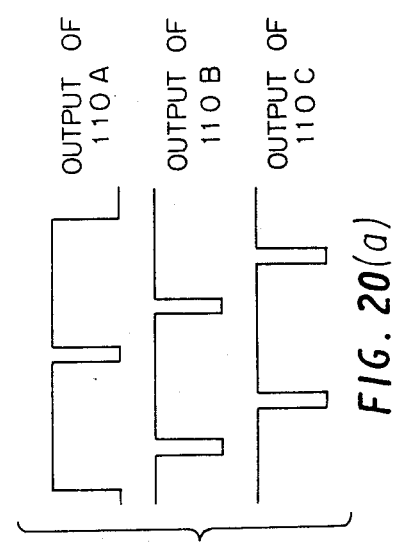
Figure 20C:
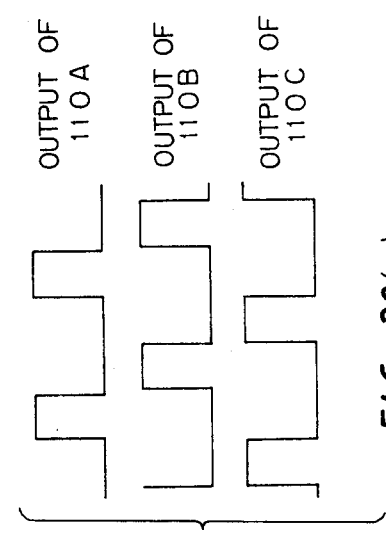

The output terminal of the error amplifier 130 is connected to one input terminal of each of the comparators 133A to 133C of the inverter units 110A to 110C through diodes 132A to 132C, respectively. Applied to the other input terminal of each of the comparators 133A to 133C are 20 KHz saw-tooth waves WA, WB and WC of 20 KHz which are fed from a saw-tooth wave generator 134 with a delay of a ⅓ period as shown in FIG. 18. The comparators 133A to 133C each produce an output signal of "1" when the signal applied to one input terminal becomes smaller than the triangular wave fed from a triangular wave generator 134.

The output terminals of the comparators 133A to 133C are connected to frequency dividers 120A to 120C of the respective inverter units 110A to 110C. The frequency dividers 120A to 120C divide into two phases the pulses produced by the comparators 133A to 133C, respectively, for application to base drive circuits 120-1 to 120-4.

Indicated at 135 is an error amplifier for the current control, which is differentially supplied with a signal of a preset current from the current indexer 136 and a signal from the current detector 125 indicating the output current of the power supply, to produce an output signal according to the difference between the two input signals.

The output terminal of the current error amplifier 135 is connected to the other input terminals of the comparators 133A to 133C of the inverter units 110A to 110C through diodes 137A to 137C, respectively. The aforementioned diode 132A and diode 137A constitute a diode OR circuit (logical sum circuit) which applies to the comparator 133A the higher one of the signals from the error amplifiers 130 and 135, so that the power supply produces an output which satisfies either one of the values specified by the preset current indexers 131 and 136.

The output of the triangular wave generator 134 has a phase difference of a 1/n period if the power supply is provided with an n-number of inverter units. It is also possible to impart a phase lag of a 2/n period by the use of n/2 triangular wave generators.

In this embodiment, the difference between the preset voltage specified by the preset voltage indexer 131 and the actual output voltage detected by the voltage detector 126 is amplified by the error amplifier 130 and applied to the comparators 133A to 133C through diodes 132A to 132C, respectively. Now, if the difference between the two signals if $L_1$ as shown in FIG. 19, for example, the comparators 133A to 133C produce output pulses $P_A$ to $P_C$, respectively, in a range where the triangular wave exceeds the level $L_1$. In this instance, the generation of the pulses $P_A$ to $P_C$ is asynchronized according to the phase lag of the triangular waves $W_A$ to $W_C$.

The output pulses $P_A$ to $P_C$ of the comparators 133A to 133C are applied to the frequency dividers 120A to 120C and thereby divided into two phase pulses and applied to the transistors 111 to 114 through the corresponding base drive circuits 120-1 to 120-4 of the inverter unit 110A, 110B or 110C. Whereupon, the transistors 111 and 114 are simultaneously turned on and off for a predetermined time period alternately with the transistors 112 and 113 to produce in the transformers 121A to 121C alternate currents of, for example, 10 KHz with a phase lag of 120°. These alternate currents are rectified through rectification circuits 122A to 122C, respectively. Thus, the outputs of the inverter units 110A to 110C appear at their output terminals with a phase lag corresponding to that of the triangular waves $W_A$ to $W_C$, so that the output which is obtained at the output terminals 127-1 and 127-2 of the power supply has a waveform with a decreased ripple component.

Since the output voltage of the error amplifier 130 corresponds to the deviation from the preset value of the detected voltage, the output voltage of the power supply is maintained at the preset value.

On the other hand, the value of the output current which is detected by the current detector 125 is applied to the error amplifier 135 which produces an output voltage proportional to the difference of the detected current from the preset value of the current indexer 136. The output voltage of the error amplifier 135 is fed to the comparators 133A to 133C through diodes 137A to 137C, respectively.

The frequency dividers 120A to 120C are controlled in a manner similar to the above-described voltage control, thereby controlling the conduction angles of the transistors of the inverters 110A to 110C to maintain the output current at the preset value.

The currents of the inverter units 110A to 110C are detected by current detectors 140A to 140C, respectively, and restricted to a level below a predetermined value by a current limiting circuit which is not shown.

If the output level of the error amplifier 135 reaches $L_2$ in a case where the load is small and the current preset circuit 136 has a small preset value, the output pulses of the comparators 133A to 133C are narrowed as shown at $P_A'$ to $P_C'$. However, direct currents corresponding to the pulses $P_A'$ to $P_C'$ are successively applied across the output terminals 127-1 and 127-2 of the welding power supply, thereby suppressing the increase of the ripple component at the output terminals.

Shown in FIG. 20 are the output waveforms of the inverter units 110A to 110C and in FIG. 21 the waveforms of the total output of the three inverter units, with regard to (a) the maximum output, (b) ⅔ the maximum output, (c) ⅓ the maximum output and (d) 1/9 the maximum output. To facilitate understanding, the respective output waves are shown in square forms.

As seen therefrom, the total output of the power supply according to the invention has a waveform with smaller intervals, with reduced ripple component. Even with a load of 1/9 the maximum output, the output waveform of the power supply according to the present invention has a smaller pulse interval $X_1$ as compared with the interval of the conventional counterpart, and consists of waves of a smaller amplitude with a ripple component which is small enough to permit practical applications.

Thus, the power supply of the foregoing embodiment can also ensure stable welding operations at a small output current of, for example, about 90 A even in a case where the maximum output is 500 A.

Figure 22:
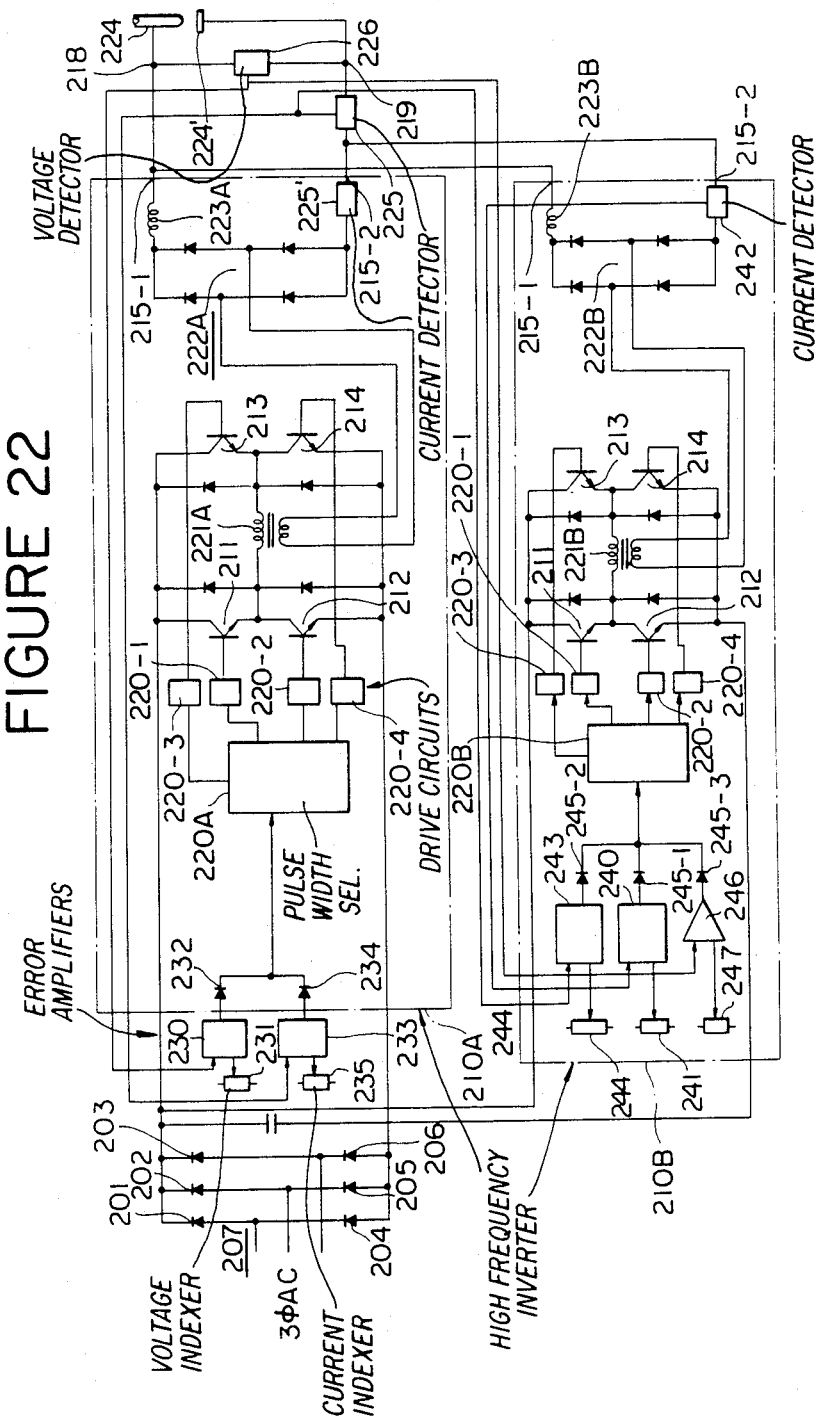
FIG. 22 is a circuit diagram of still another embodiment of the invention, constructed particularly for dip transfer welding.

Referring to FIG. 22, there is shown another welding power supply according to the present invention, which is provided with a couple of inverter type DC power sources to be selectively operated for short circuiting and arc generating periods in dip transfer welding. The couple of converter type power sources are provided to reduce the capacity (KVA) of the power supply in addition to achieving reductions in size and weight.

In FIG. 22, the reference numerals 210A and 210B denote high frequency inverter units including transistors 211 to 214 which are bridged in the same manner as in FIG. 1, pulse width control circuits 220A and 220B, base drive circuits 220-1 to 220-4 for the respective transistors, output transformers 221A and 221B, and rectification circuits 222A and 222B.

The inverter units 210A and 210B are connected to DC output terminals of a rectification circuit 207 with diodes 201 to 206 for rectifying three-phase AC line current, supplying a predetermined DC voltage across the collector and emitter of the transmitters 211 and 212 and across the collector and emitter of the transistors 213 and 214 of the respective inverter units 210A and 210B.

The winding ratios of the output transformers 221A and 221B of the inverter units 210A and 210B are determined such that the former has a maximum output of 30 V–250 A and the latter a maximum output of 10 V–250 A.

The positive (+) output terminals 215-1 of the inverter units 210A and 210B are commonly connected to an output terminal 218, and have their negative (−) output terminals 215-2 connected also commonly to the source side terminal of a current detector 225. Thus, the output of the two inverter units 210A and 210B are connected in parallel with each other.

Connected between the output terminals 218 and 219 is a voltage detector 226 which detects the output voltage of the power supply system, a welding electrode 224 and a base material 224'.

Indicated at 230 is an error amplifier for controlling the voltage of the inverter unit 210A, which is differentially supplied with a signal of the preset voltage from the voltage indexer 231 and a signal of the detected voltage from the voltage detector 226 indicating the actual output voltage of the power supply system, producing an output signal of a voltage corresponding to the difference between the two input signals. The output terminal of the error amplifier 230 is connected to a pulse width control circuit 220A of the inverter unit 210A through diode 232.

The reference numeral 233 denotes an error amplifier which controls the inverter unit 210A to hold the total output currents of the inverter units 210A and 210B at a predetermined value. Amplifier 233 is differentially supplied with a signal of a preset current value from a current indexer 235 and a signal of the total output current of the power system from the current detector 225, producing an output signal according to the difference between the two input signals. The output terminal of the current control error amplifier 233 is connected to the input terminal of the pulse width control circuit 220A through diode 234.

The output signals of the error amplifiers 230 and 233 are thus applied to the pulse width control circuit 220A through parallel circuits of diodes 232 and 234, so that the pulse width control circuit 220A produces output pulses of a width corresponding to the logical sum of the outputs of the two error amplifiers 230 and 233. The reference numeral 225 denotes a current detector solely for the inverter 210A.

On the other hand, the inverter unit 210B is provided with an error amplifier 240 for controlling the current at a value lower than its maximum output current. The error amplifier 240 is supplied with a signal of a preset current from the current indexer 241 and a signal of detected current from the current detector 242 in the output circuit of the inverter unit 210B, to produce an output signal to be fed to the pulse width control circuit 220B to control the output current of the inverter unit 210B below a preset value.

Indicated at 243 is an error amplifier which controls the inverter units 210B such that the total output current of the two inverter units 210A and 210B takes a predetermined value. Amplifier 243 is differentially supplied with a signal of preset current from the current indexer 244 and a signal of detected welding current from the current detector 225 indicating the total output current of the power supply system, to produce an output signal proportional to the difference between the two input signals.

The output terminal of the error amplifier 243 is connected to the pulse width control circuit 220B through diode 245-1. Denoted at 246 is a comparator which controls the inverter units 210B to actuate and de-actuate same in short circuit and arcing periods of the welding operation, respectively. The comparator 246 compares the signal of preset voltage from the voltage indexer 247 with the signal of detected actual voltage from the voltage detector 226 to produce an output signal of "0" when the detected voltage is higher than the preset value and otherwise an output signal of "1".

The output terminal of the comparator 246 is connected to the pulse width control circuit 220B, which produces an output signal to actuate the inverter unit 210B when the output of the comparator 246 is "1" and an output signal de-actuating the inverter unit 210B when the output of the comparator 246 is "0".

In the foregoing power supply system, the current indexer 241 is preset, say, at 250 A while the voltage indexer 247 is preset, say, at 12 V.

For example, if the output voltage of the power supply across the output terminals 218 and 219 is 30 V in an arcing time of a welding operation, that voltage is detected by the voltage detector 226 and applied to the comparator 246 for comparison with the preset voltage from the voltage indexer 247. In this instance, since the detected voltage is higher than the preset value, the comparator 246 produces an output signal of "0" to hold the inverter unit 210B in the de-actuated state.

Therefore, the inverter unit 210A alone is operated in the arcing period in the following manner. Namely, the DC voltage, for example, a DC voltage of 280 V which is obtained from the rectification circuit 207 is applied to the transistors 211 to 214. On the other hand, the signal indicating the terminal voltage detected by the voltage detector 226 is applied to the error amplifier 230, which produces an output signal according to the deviation from the signal of preset voltage supplied from the voltage indexer 231, feeding the output signal to the pulse width control circuit 220A.

In the meantime, the load current which is detected by the current detector 225 is fed to the error amplifier 233, which produces an output signal according to the deviation from the signal of preset value from the current indexer 235, and applies the output signal to the pulse width control circuit 220A. Whereupon, the pulse width control circuit 220A produces pulses of a width corresponding to the logical sum of the outputs of the error amplifiers 233 and 230 thereby to drive the transistors 211 to 214. As a result, there can be obtained at an output terminal an output which is specified by the voltage indexer 231 or the current indexer 235 according to the load condition.

If the voltage across the terminals 218 and 219 becomes, for example, 10 V by short circuiting of the welding 224 against the base material 224', the comparator 246 of the inverter unit 210B produces an output signal of "1" to actuate the pulse width control circuit 220B. Therefore, the inverter units 210A and 210B are operated concurrently to supply the sum of the output currents of the two inverter units 210A and 210B to the welding electrode 223.

At this time, the total output current of the inverter units 210A and 210B, which is detected by the current detector 225, is applied to the error amplifier 233 of the inverter unit 210B, each error amplifier producing an output signal corresponding to the deviation of the input signal. In response to the output levels of the respective error amplifiers 233 and 243, the pulse width control circuits 220A and 220B produce pulses of corresponding widths thereby driving the transistors 211 to 214 at predetermined conduction angles to maintain the output currents of the inverter units 210A and 210B at predetermined values, for example, at 250 A for both inverter units 210A and 210B in this particular example.

As clear from the foregoing description, substantially the inverter unit 210A alone is driven in an arcing period to produce an output of 30 V–250 A, while in a short circuiting period both inverter units 210A and 210B are driven to produce a total output of 10 V–500 A, when the output of 10 V–250 A by the inverter unit 210B is added to that of inverter unit 210A.

If, for example, the current indexers 235 and 244 are set at 250 A and 400 A, respectively, the output current of the inverter unit 210A is limited to 250 A in a short circuiting period and the other inverter unit 210B produces an output of 400 A−250 A=150 A.

If the total output current becomes higher than 500 A due to an increase of the load and the value detected by the current detector 242 of the inverter unit 210B exceeds 250 A, the error amplifier 240 produces an output which controls the pulse width modulator 220B in such a manner as to clamp the output of the inverter unit 210B at 250 A. However, this circuit, including the current detector 242 and error amplifier 240, is not necessarily required.

In addition, the voltage indexer 247 and comparator 246 may also be omitted if desired. If they are omitted, the inverter unit 210B produces an output of 10 V in an arcing period of 23 V–200 A, but there occurs no current flow from the inverter unit 210B since the arc voltage is, say, at 23 V.

The voltage in the arcing period can be adjusted by altering the preset value of the voltage indexer 231 of the inverter unit 210A, while the short circuiting current in the short period is adjustable by altering the preset value of the current indexer 244 of the inverter unit 210B. It should be noted that the output voltage and current of the respective inverter units can also be artibrarily determined. If desired, arrangement may be made to operate simultaneously plural parallel inverter units.

Figure 23:
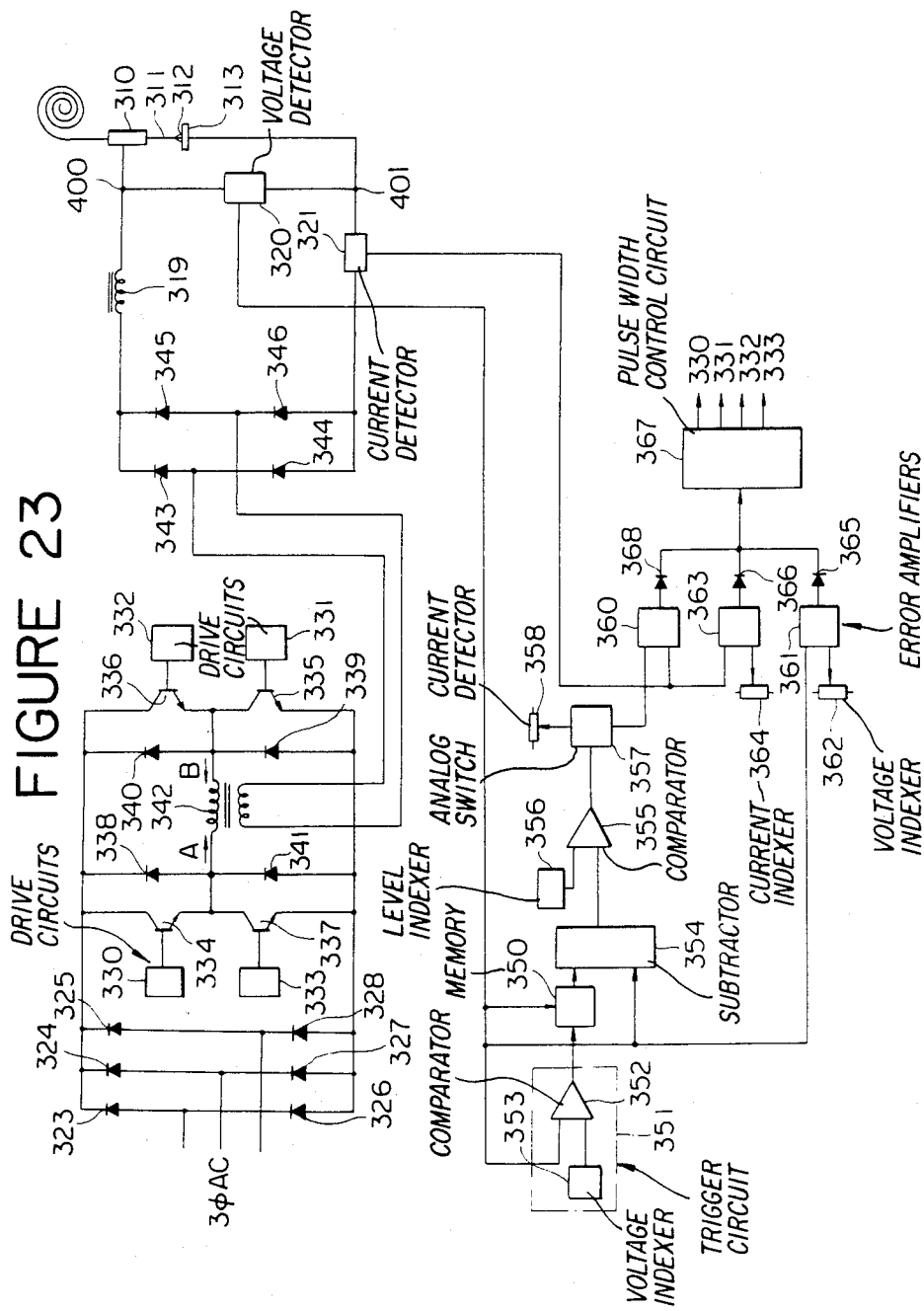
FIG. 23 is a circuit diagram of a further embodiment of the invention, also constructed particularly for dip transfer welding.

In order to reduce spattering by controlling the voltage and current in the short circuit period in dip transfer welding, the power supply is required to have a response at least ten times as high as the short circuiting time of 1 ms–5 ms, namely, to be able to make at least one feedback per 100 $\Sigma$s. Needless to say, the frequency of the inverter is preferred to be as high as possible to suppress the phenomenon of short circuit welding. FIG. 23 shows a further embodiment which is provided with a feedback control to suppress the current with a good timing in a final stage of short circuit periods of large current, which have a great influence on spattering.

Referring to FIG. 23, three-phase AC (200 V) at line frequency which is rectified by diodes 323 to 328 flows on the primary side of a transformer 342 in the direction of arrow A when transistors 334 and 335 are simultaneously turned on by base drive circuits 330 and 331. If the transistors are turned off simultaneously by the base drive circuits 330 and 331 and instead transistors 336 and 337 are turned on by base drive circuits 332 and 333, current flows on the primary side of the transformer 342 in the direction of arrow B. In this manner, alternate current flows on the primary side of the transformer 342 at a frequency higher than 5 KHz. The transformer 342 has such a winding ratio as to produce on its secondary side a voltage suitable for welding. In this instance, the diodes 338 to 341 conduct when the primary winding of the transformer 342 becomes higher than the input voltage, serving to clamp it below the input voltage and at the same time to feed back the stored energy of the primary winding of the transformer to the input power source when the transistors 334 to 337 are turned off.

The output on the secondary side of the transformer 342 is rectified again by diodes 343 to 346 and supplied to a contact tip 310 through a reactor 319. Power is supplied as a wire 311 is passed through the contact tip 310, generating an arc across the wire 311 and a base material 313. The reactor 319 may be omitted in some cases.

The current or voltage across the output terminals 400 and 401 of the inverter is adjustable by varying the ratio of the turn-on time to the turn-off time of the transistors 334 to 337. The reference numerals 320 and 321 denote a voltage detector and a current detector, respectively.

In FIG. 5, the voltage detector 320 which is connected to the output terminals 400 and 401 produces an output signal of detected voltage, corresponding to the voltage applied across the output terminals 400 and 401. The output terminal of the voltage detector 320 is connected to one input terminal of an error amplifier 361 which controls the output voltage across the terminals 400 and 401 in the arcing periods. The other input terminal of the error amplifier 361 is connected to an arc voltage indexer 362.

On the other hand, the current detector 321 produces an output signal proportional to the output current of the power supply system, and its output terminal is connected to one input terminal of an error amplifier 363 which controls the output current. The other input terminal of the error amplifier 363 is connected to a short circuit current indexer 364. The output terminals of the error amplifiers 361 and 363 are connected to a pulse width control 367 through diodes 365 and 366, respectively.

With the foregoing system arrangement, the voltage in an arcing period which is indicated by the output signal of the voltage detector 320 is compared with the signal from the voltage indexer 362 by the error amplifier 361, which produces an output signal proportional to the deviation of the detected voltage. This output signal is fed through diode 365 to the pulse width control 367 which produces a pulse width signal determined in accordance with the value of deviation, supplying the pulse width signal alternately to the base drive circuits 330 and 331 and the other base drive circuits 332 and 333. As a result, the transistors 334 and 335 and the transistors 336 and 337 are alternately turned on by the base drive circuits 330 to 333 for a length of time corresponding to the pulse width, thereby controlling the output voltage of the power supply system at a value determined by the voltage indexer 62.

On the other hand, as soon as the arc extinguishes by short circuiting, there occurs an abrupt drop in the load impedance and therefore an abrupt increase in the current. The signals of the current detector 321 and the short circuit current indexer 364 are compared and amplified by the error amplifier 363, supplying an error signal to the pulse width indexer 363 through diode 366 thereby to control the output current of the power supply system to a value specified by the short circuit current indexer 364 in the same manner as in the above-described voltage control.

The output terminal of the voltage detector 320 is connected to a memory 350 which stores the lowest voltage applied across the welding wire 311 and the work 313, as well as to one input terminal of a comparator 352 of a trigger circuit 351 which controls the operation of the memory 350. Connected to the other input terminal of the comparator 352 is a voltage indexer 353 which produces a signal of a reference voltage intermediate between the arc voltage and the short circuit voltage. The output terminal of the comparator 352 is connected to the memory 350 and produces an output signal of "1" when the detected voltage is lower than the preset voltage thereby to actuate the memory 350 to store the minimum value of the terminal voltage detected by the voltage detector 320.

The output terminal of the memory 350 is connected to one input terminal of a subtractor 354 which has the other input terminal connected to the output terminal of the voltage detector 320 to compute the difference V between the minimum voltage stored in the memory 350 and the terminal voltage.

The output terminal of the subtractor 354 is connected to one input terminal of a comparator 355 which has the other input terminal connected to a level indexer 356, with its output terminal connected to an analog switch 357. The analog switch 357 has its input terminal connected to a final-stage short circuit current detector 358 and its output terminal to an error amplifier 360 for lowering the short circuit current.

With the foregoing system arrangement, a voltage drop occurs in a short circuiting time, giving rise to a variation in voltage which is clearly different from that in an arcing time. As soon as the output of the voltage detector 320 becomes lower than the output of the reference voltage indexer 353, the trigger circuit 351 actuates the memory 350 to start reading. Through the reading operation, the memory 350 stores the minimum value of the signal from the voltage detector 320, namely, the minimum voltage across the output terminals 400 and 401. Then, the subtractor 354 produces an output signal indicating the difference between the signals of the voltage detector 320 and memory 350. Further, as soon as the output of the subtractor 354 becomes greater than the preset value of the level command 356, the comparator 355 turns on the analog switch 357 to feed the signal of the final-stage short circuit current indexer 358 to the error amplifier 360 thereby to compare and amplify the difference between the signals of the final-stage short circuit current indexer 358 and the current detctor 321 and to control the output current of the power supply system to the value specified by the final-stage short circuit current indexer 358. In this instance, when the analog switch 353 is off, the error amplifier 360 is controlled by a preset current value higher than that of the short circuit current command 364 or a non-limiting signal although not shown.

The diodes 365, 366 and 368 constitute the so-called diode OR circuit so that a pulse width which satisfies either one of the conditions stipulated by the error amplifiers 360, 361 and 363 is established in the pulse width command 367.

In operation, assuming that the final-stage short circuit current command 358 produces a signal corresponding to an output current of 200 A, the short circuit current indexer 364 produces a signal corresponding to an output current of 400 A, and the voltage indexer 362 produces a signal corresponding to an output voltage of 23 V, and that the wire 311 is fed at a speed corresponding to an average current of 210 A, the output in the arcing period is about 23 V-180 A and the analog switch 357 is off at this time, imposing no limit on the current. Therefore, although the error amplifiers 360, 361 and 363 instruct the power supply system to produce an output of ∞ A, 400 A and 23 V, respectively, the power supply system produces an output of 23 V which is satisfied by the diode OR circuit.

Then, when the analog switch 357 is not yet turned on by the output of the comparator 355 after occurrence of short circuiting between the welding wire 311 and work 313, the error amplifiers, 360, 361 and 363 still call for the outputs of ∞ A, 400 A and 23 V, respectively. Therefore, the power supply system tends to produce an output of 23 V, but the load current is increased due to a reduction of load impedance caused by short circuiting and current of 400 A flows through the load. At this time, the preset current of 400 A of the short circuit current indexer 364 satisfies a value specified by the error amplifiers 360, 361 and 363, so that the power supply system produces an output of 400 A regardless of the voltage. The supply voltage in a short circuit period is applied to the comparator 352 through the voltage detector 320 for comparison with the preset voltage of the reference voltage indexer 353, the comparator 352 sending the memory 350 a command signal to start reading the minimum voltage when the voltage of the power supply becomes lower than the preset value. The memory 350 stores the lowest value V of the detected voltage from the voltage detector 320.

Upon lapse of the short circuit time, the subtractor 354 computes the difference of the lowest value V stored in the memory 350 from the output V of the voltage detector 320, turning on the analog switch 357 if the difference is greater than a preset value of the level indexer 356 to feed the final-stage short circuit current indexer 358 to the error amplifier 360 through the analog switch 357.

Although the error amplifiers 360, 361, and 363 instruct the power supply to produce an output of 200 A, 400 A and 23 V, respectively, the output of the power supply is determined in preference of the output of the error amplifier 360 which is governed by the signal of preset current 200 A from the final-stage short circuit current indexer 358, lowering the output current from 400 A to 200 A. In this manner, the output current in the final stage of the short circuit period in transition to an arcing period is lowered to a value as low as 200 A to suppress spattering.

In order to suppress the spattering effectively, it is preferred to start reading by the memory 350 when the short circuit current reaches a constant level, and this can be attained by a trigger circuit 351 which is constructed as shown in FIG. 24.

Referring to FIG. 24, the trigger circuit includes a comparator 372 which produces an output signal when the signal of the voltage detector 320 is smaller than a signal of a voltage indexer 371 which produces a signal of a voltage intermediate between the short circuit voltage and the arc voltage; a comparator 374 which produces an output signal when the signal of the current detector 321 becomes the same as or greater than the signal of a voltage indexer 373 which produces a signal corresponding to or slightly smaller than the short circuit current; and a logic circuit 375 which instructs the memory 350 to start reading when the comparators 372 and 374 simultaneously produce output signals and to erase the memory when the output signal of the comparator 372 disappears. With this trigger circuit 351, the reading is not started until the current reaches the value of short circuit current in each short circuit period, and the memory is erased upon generation of an arc.

In order to suppress the spattering in a case where the short circuit current is varied, the level indexer 356 is arranged as shown at 380 of FIG. 25. Namely, the output of the current detector 321 is fed to the comparator 355 after shaping waves through a filter circuit 381 and multiplying a constant k by a multiplier 382. As shown particularly in FIG. 25, the multiplier 382 is constituted by an operational amplifier Q and resistances R10 and R11 which determines the above-mentioned constant k as k=R11/R10. In this instance, the level indexer 380 supplies the comparator 355 with a signal of k·I (=ΔV) thereby to suppress the spattering even in a spatial case where the short circuit current is varied. The filter circuit 381 may be omitted if the current has a smooth waveform.

What is claimed as new and desired to be secured by Letters Patent in the United States is:

1. In a welding apparatus, an improved DC power supply system connected to a consumable or non-consumable electrode adapted for welding a work piece, said power supply comprising:
- plural inverter units adapted to convert a first direct current into an alternating current and to rectify the alternating current to produce an output of a second direct current;
- a circuit connecting the output terminals of said inverter units in parallel relation;
- a detection circuit for detecting the total output current of said inverter units; and
- a circuit for varying the number of operating inverter units according to the value of the detected total output current such that a ripple component of said total output current is minimized.

2. A DC welding power supply system as set forth in claim 1, wherein said circuit for varying the number of operating inverter units comprises:
- a load current detector;
- a current indexer with a preset current value lower than an output current equivalent to the total rated output current of said inverter units; and
- a comparator for comparing the output signals of said load current detector and current indexer and to produce an output signal if said load current is lower than said predetermined current value, thereby deactuating a selected inverter unit or units.

3. A DC welding power supply system as set forth in claim 1, further comprising a phase control means for controlling said inverter units to produce respective of said alternating currents having a predetermined phase lag with respect to each other.

4. A DC welding power supply system as set forth in claim 3, wherein said phase control means comprises: a triangular wave generator for generating plural triangular waves of different phases; an indexing means for setting a predetermined value; a load detector for detecting the level of a load; an error amplifier for producing an output signal corresponding to the difference between the output signals of said indexing means and said load detector; and comparators provided for the respective triangular waves to determine a respective pulse width by comparing a corresponding triangular wave with the output of said error amplifier.

5. A DC welding power supply system as set forth in claim 4, wherein said indexing means comprises a voltage indexer presetting a value corresponding to a predetermine maximum total output voltage of said inverter units; said load detector comprises a voltage detector monitoring the total output voltage of said inverter units; and said error emplifier is operated on the basis of the output signals of said voltage indexer and said voltage detector.

6. A DC welding power supply system as set forth in claim 4, wherein said indexing means comprises a current indexer presetting a value corresponding to a predetermined maximum total output current of said inverter units; said load detector is a current detector monitoring the total output current of said inverter units; and said error amplifier is operated on the basis of said current indexer and current detector.

7. A DC welding power supply system as set forth in claim 3, wherein said phase control means comprises: a triangular wave generator for generating plural triangular waves of different phases; a voltage detector for detecting the voltage at an output terminal connecting said inverter units in parallel relation; a voltage error amplifier for producing an output signal corresponding to the difference between the value of voltage detected by said voltage detector and the preset value of said voltage indexer; a current detector for detecting the current at said output terminal connecting said inverter units in parallel relation; a current error amplifier for producing an output corresponding to the difference between the value of current detected by said current detector and the preset value of said current indexer; a logical sum circuit connected to the output terminals of said voltage error amplifier and current error amplifier; and plural comparators for comparing the respective triangular waves with the output of said logical sum circuit.

* * * * *